United States Patent [19]

Allen

[11] Patent Number: 5,706,345
[45] Date of Patent: Jan. 6, 1998

[54] OVER THE HEAD HANDS FREE PHONE HOLDER

[76] Inventor: James E. Allen, 2701 Voorhees Ave. #5, Redondo Beach, Calif. 90278

[21] Appl. No.: 616,380

[22] Filed: Mar. 15, 1996

[51] Int. Cl.$^6$ ............................. H04M 1/00; H04R 25/00
[52] U.S. Cl. ...................... 379/430; 381/183; 381/187
[58] Field of Search ........................ 379/430, 449, 379/446, 454, 455, 428; 381/183, 187

[56] References Cited

U.S. PATENT DOCUMENTS

| | | | |
|---|---|---|---|
| 4,529,057 | 7/1985 | Telford | 379/187 |
| 5,233,650 | 8/1993 | Chan | 379/430 |

*Primary Examiner*—Jack K. Chiang

[57] ABSTRACT

An over the head hands free phone holder comprising an adjustable headband terminated on each end by pivotable rigid housings whose inner surfaces are terminated by resilient ear cushions similar to an audio headset. A phone holding housing has an opening at the lower end which accepts most portable phones. Opposing gripping fingers on the left and right sides of the phone holding housing help hold the phone in place. The opposing, non-phone housing contains a perforated wall to which the resilient ear cushion is attached. A mating inner sliding wall has matching perforations. When the inner wall slides in a downward direction, the holes are misaligned with respect to the non-sliding wall, thereby blocking unwanted ambient noise. The non-phone housing also contains a weight to balance and offset the weight of the phone located on the opposite side of the user's head.

3 Claims, 7 Drawing Sheets

2

OVER THE HEAD HANDS FREE PHONE HOLDER

FIELD OF INVENTION

The present invention relates to the telephone and holds the telephone and/or phone receivers comfortably and securely to a persons ear and mouth.

BACKGROUND OF INVENTION

It has been conventional practice to hold the telephone and/or phone receiver to the mouth and ear with the use of the hand. Difficulties are encountered if the phone user is handicapped in the hands and/or arms and can't hold the phone or if the user needs their hands free to do other work. Our "hands-free" phone holder allows the phone to be used independently from the use of the hands.

Hands free phone holders are known. In 1934, Pat. No. 1,951,332 R. H. Barclay designed a mechanism which included spring like bands which grip the head terminating on one side in an adjustable collar which accepts the ear piece of a telephone instrument. A secondary ring and attached wire member connect to the mouthpiece of the telephone instrument thereby helping to orient the mouthpiece in the vicinity of the users mouth.

Others have made variations or improvements on Barclay's original design. Other subsequent designs include: Pat. No. 2,360,027 by S. E. Werner, Pat. No. 2,481,387 by Bonecutter, Pat. No. 2,460,458 by Korbin, Pat. No. 2,598,928 by McCorell, Pat. No. 4,048,453 by Seidell, Pat. No. 4,367,378 by Jordan, Pat. No. 4,821,317 by Wong, Pat. No. 5,388,155 by Smith and Pat. No. 5,407,113 by Gollimer.

In all the above cited Patents the hands-free phone holding devices described provide a design whereby the phone is held to the head by either an over the head spring type headband or by an elastic strap which encircles the users head and chin.

The springy headband types all terminate one side with a phone holding device covering the users ear and on the other side in a pad or flat surface which grips the persons head just above the ear. This design is problematic in that the weight of the phone can eventually pull the head band to one side thereby causing the phone to be improperly oriented with respect to the person's ear and mouth. The elastic band designs cause the entire phone instrument to be pushed into the users ear and cheek portion of the head thereby causing discomfort and, in some cases, accidental activation of buttons located on the portion of the phone adjacent to the users cheek. Some of the designs in the prior art cited above accommodate only one style of phone thereby limiting the type of phone to be used. Still other designs, such as Gollimer's Pat. No. 5,407,113 require the user to permanently attach fasteners to the phone in order for the design to work. This approach disfigures the phone.

One other approach has been discussed in the prior art by Huntly, Pat. No. 4,802,211 which involves supporting the phone by a brace which rests on the shoulders and is fastened by strap members which wrap under the arms of the user. This approach appears cumbersome and would interfere with the users side to side head motion.

SUMMARY OF THE PRESENT INVENTION

It is an object of the present invention to provide a hands-free phone holder which easily accepts a wide variety of phone styles. A further object of the present invention is to provide a hands free phone holder which uses a pair of ear muffs similar to those found on stereo headphones combined with an adjustable headband to provide a comfortable, secure fit on a person's head.

Another object of the present invention to provide a hands-free phone holder in which the padded ear muff on the non phone ear can be adjusted to let surrounding sound in or to block it out. Still a further object of the present invention to provide a hands-free phone holder in which the non phone ear muff is weighted to act as a counterweight to the phone the opposite side.

Another object of the present invention to provide a hands free phone holder in which no additional parts need to be permanently fastened to the phone in order for the design to work.

To these ends, the present invention fulfills all the above objects as will be described by the drawings and description given below.

BRIEF DESCRIPTION OF THE DRAWINGS

The features of the present invention which are believed to be novel, are set forth with particularly in the appended claims. The present invention both as to its organization, and its manner of operation, together with further objects and advantages thereof, may best be understood with reference to the following description, taken in connection with the accompanying drawings in which:

DETAILED DESCRIPTION OF THE DRAWINGS

Figure 1:
FIG. 1 is a front perspective view of a person wearing the phone holder of the present invention.

FIG. 1 shows a user wearing the hands-free phone assembly 2. The overall trait allows the user to talk or speak comfortably on a remote phone 4 without using his or her hands.

Figure 2:
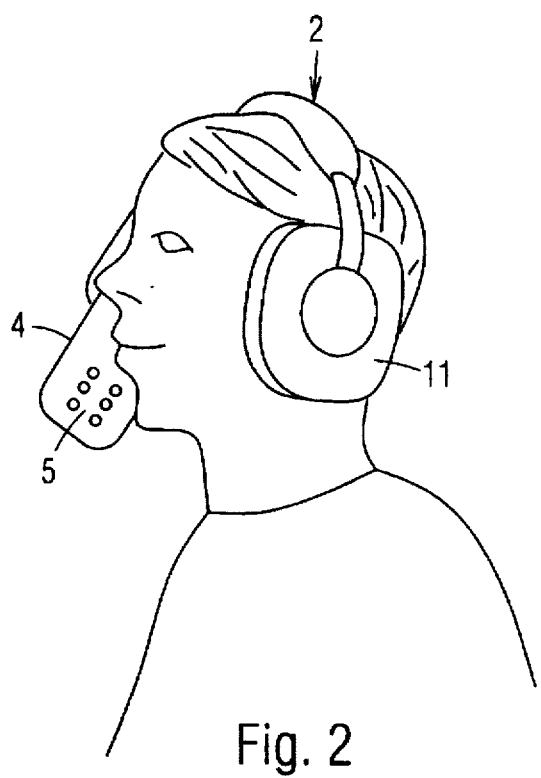
FIG. 2 is a side perspective view of a person wearing the phone holder of the present invention.

FIG. 2 shows a side view of a person using the present invention. The phone 4 is positioned so that the mouthpiece 5 is in proximity to, but not touching, the users mouth.

Figure 3:
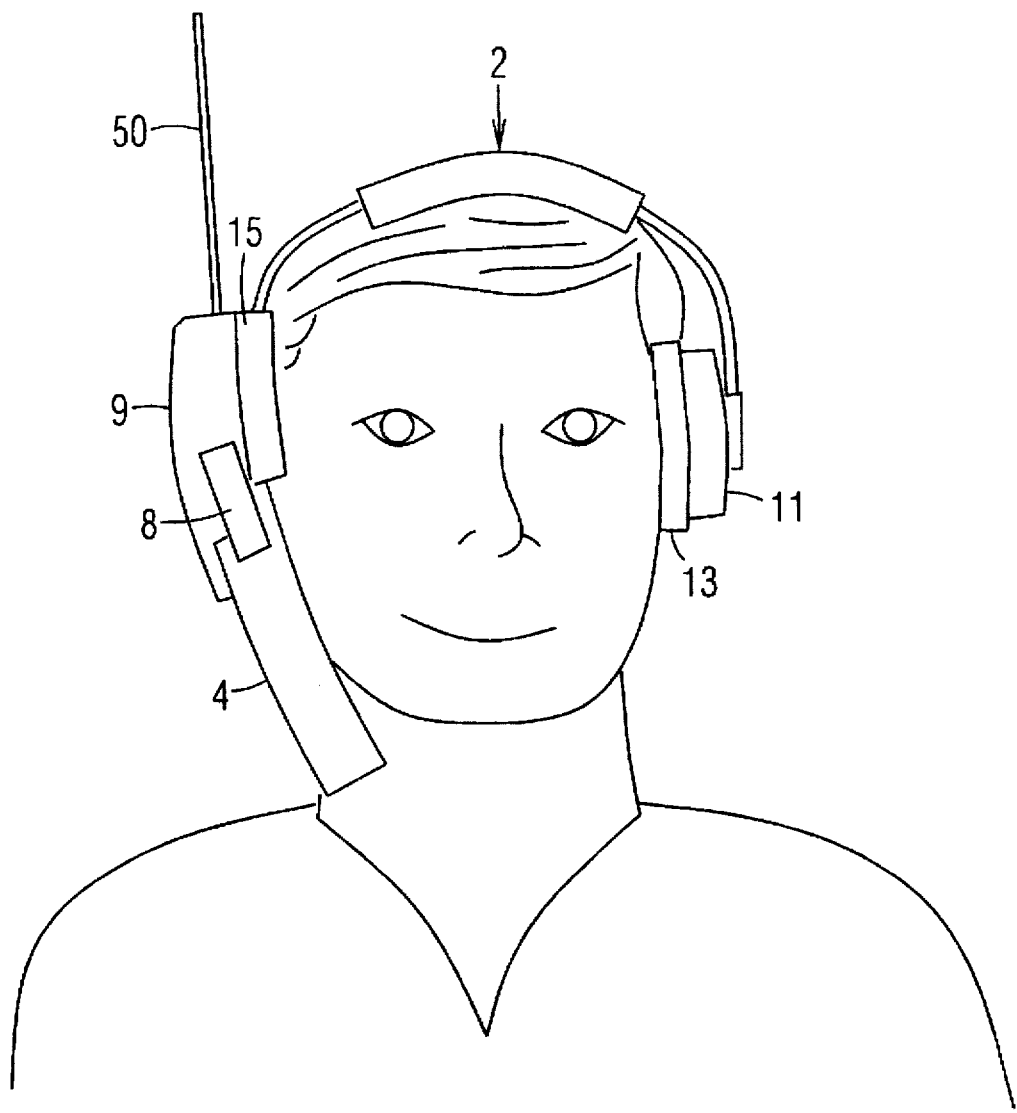
FIG. 3 is a front view of a person wearing the phone holder of the present invention.

FIG. 3 shows a front view of the present invention ear muff 13 cushions the users non-phone ear. Ear muff 15 cushions the person's phone ear much as a pair of stereo head phones do.

Figure 4:
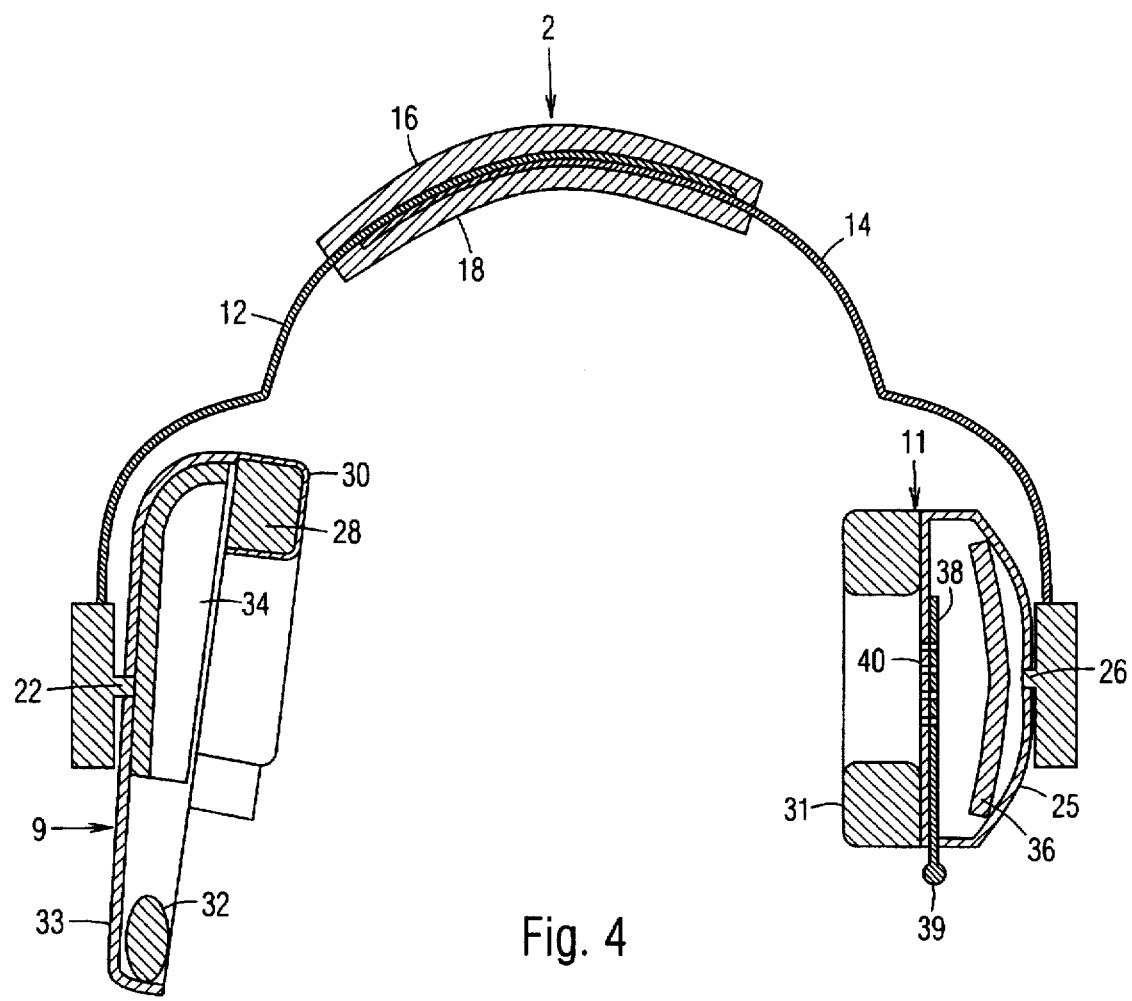
FIG. 4 is a section view of a person wearing the phone holder of the present invention.
Figure 5:
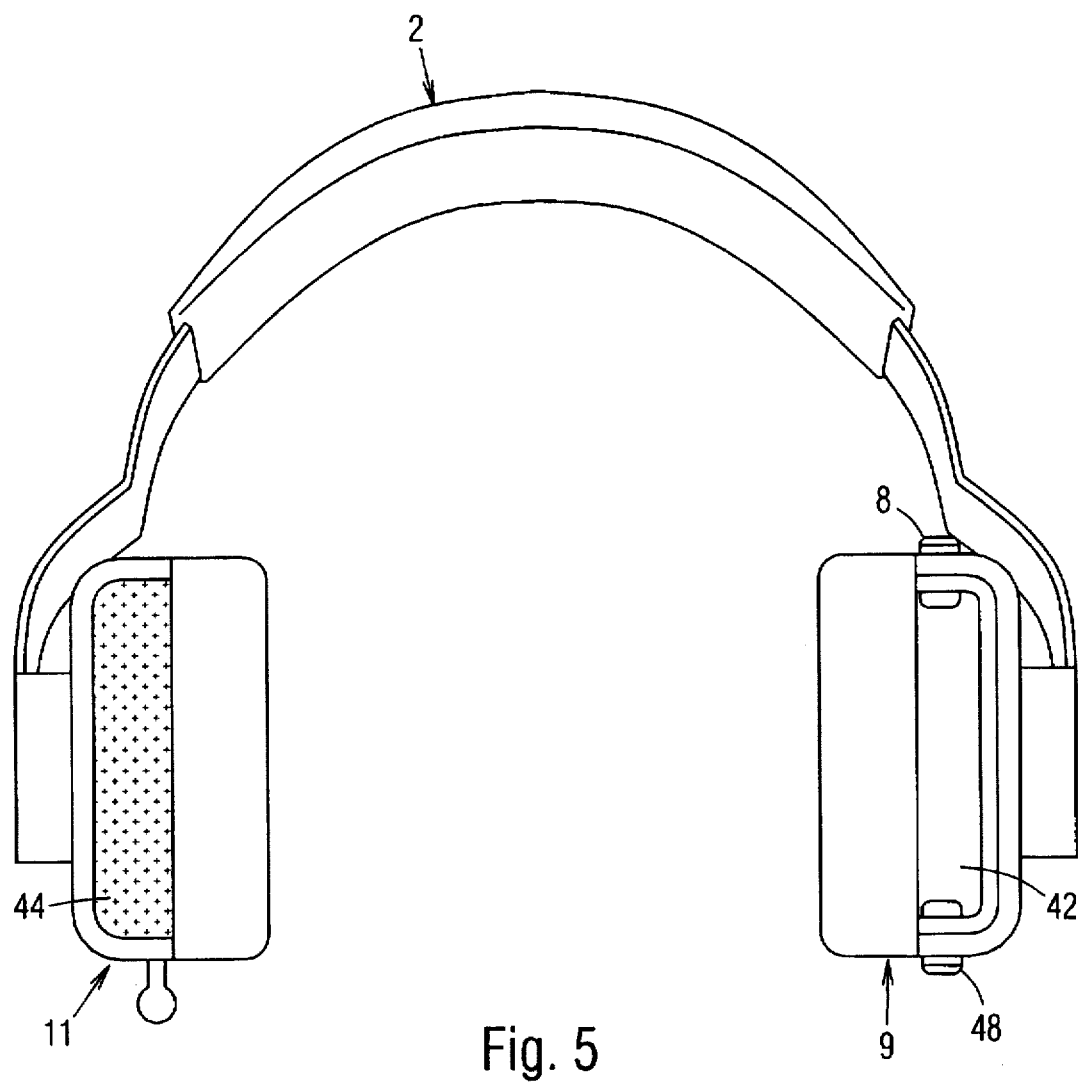
FIG. 5 is a top view of a person wearing the phone holder of the present invention.
Figure 6:
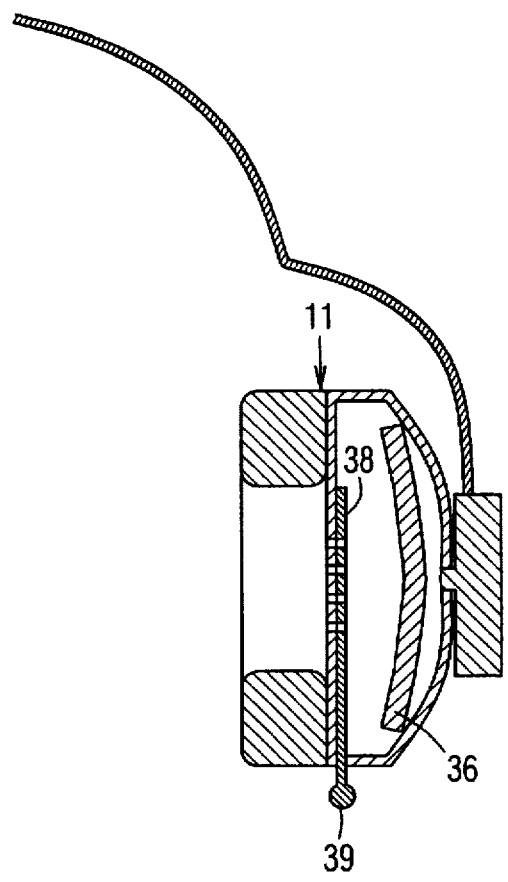
FIG. 6 is a section view of the non phone ear piece of the phone holder of the present invention with sound barrier in the open position.
Figure 7:
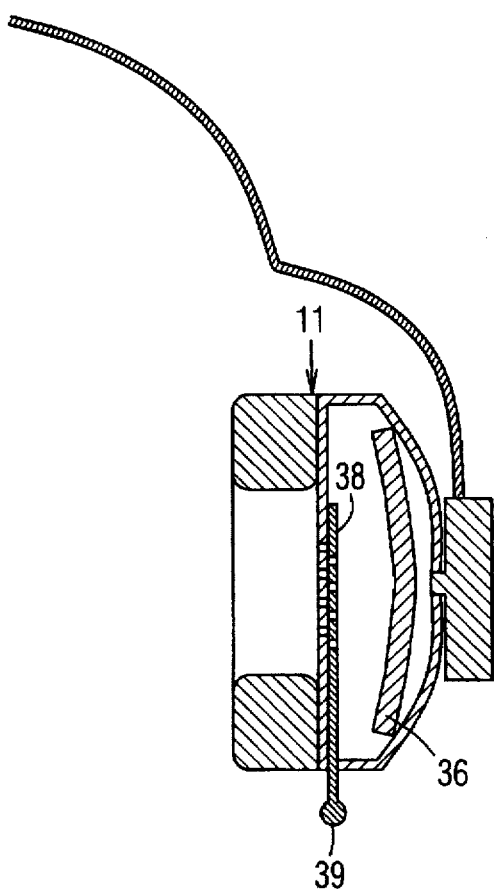
FIG. 7 is a section view of the non phone ear piece of the phone holder of the present invention with sound barrier in the closed position.

FIG. 4 shows a section view of the present invention. The phone holding assembly 9 consists of a pivot joint 22 joined to a rigid molded shell 33. Joint 22 and opposing joint 26 allows entire assembly to be adjusted so that phone holding assembly 9 can be worn on left or right ear. Foam pads 34 and 32 help cradle a phone and cause the phone to slide into the assembly 9 easily. Foam cushion 28 is covered by a vinyl, leather or cloth cover 30. Steel headband 12, 14 is joined by sleeve 16. Headband portions 12 & 14 can slide over each other to adjust the entire assembly 2 to the size of a users head. Foam pad 18 cushions the headband of the users head. The non-phone holding ear piece 11 contains a similar padded cushion 31. Perforated back plate 40 allows sound to pass through. Adjacent slideable plate 38 also has matching perforations. When plate 38 is pulled down by knob 39, the perforated holes are no longer in alignment and cause outside sound to be blocked. FIG. 6 and FIG. 7 show this more clearly. The closed configuration as shown in FIG. 7 helps the user hear a phone conversation when there is a high ambient noise condition. Lead weight 36 is connected to the rear wall 25 of ear piece 11. This weight 36 helps counter balance the weight of the phone on the opposite ear. FIG. 5 is a top view of phone ear assembly 9 and a side view non-phone assembly 11 as would be the case in normal use where the phone assembly 9 is turned at a 60° angle with respect to the head band. Phone ear assembly 9 is open on top 42 to allow the phone's antennae to pass through. Non-phone assembly 11 has a fabric covered or otherwise perforated portion 44 which helps enclose the assembly yet allows air and sound to pass through.

Figure 8:
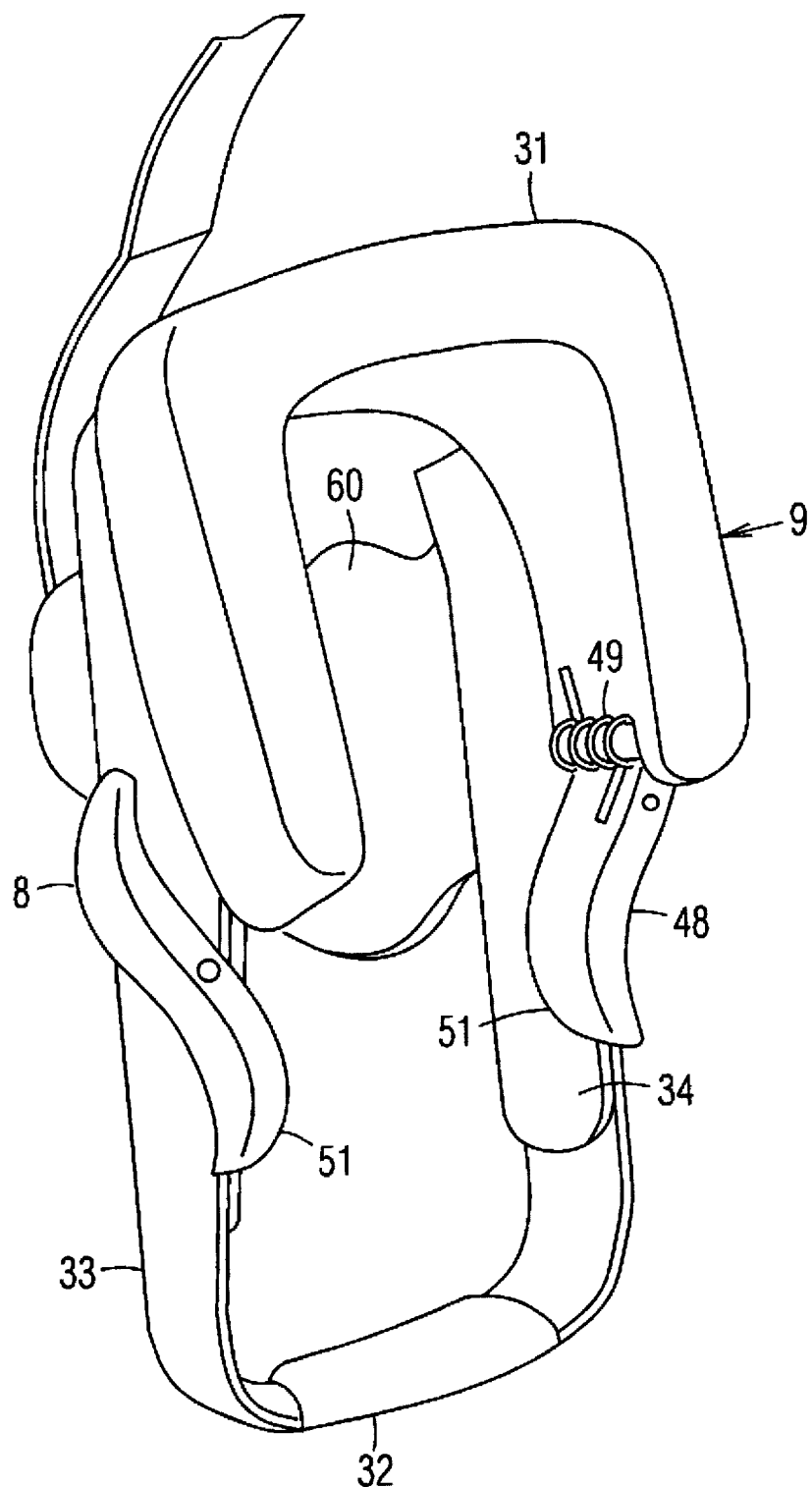
FIG. 8 is a perspective view of the phone holding portion of the phone holder of the present invention.

FIG. 8 shows a perspective view of phone holder assembly 9. Gripper fingers 8 & 48 are spring loaded by torsion spring 49. When a phone is pushed into place, gripper fingers 8 & 48 are engaged at lower portion 51 and gripper fingers 8 & 48 are forced open by the top end of the phone. The bottom edge of ear cushion 31 helps keep the phone from falling forward. Padded back plate 60 keeps phone from falling backward. Rigid plastic frame 33 holds phone in place and foam pads 32 help phone slip in place and improve gripping ability.

Figure 9:
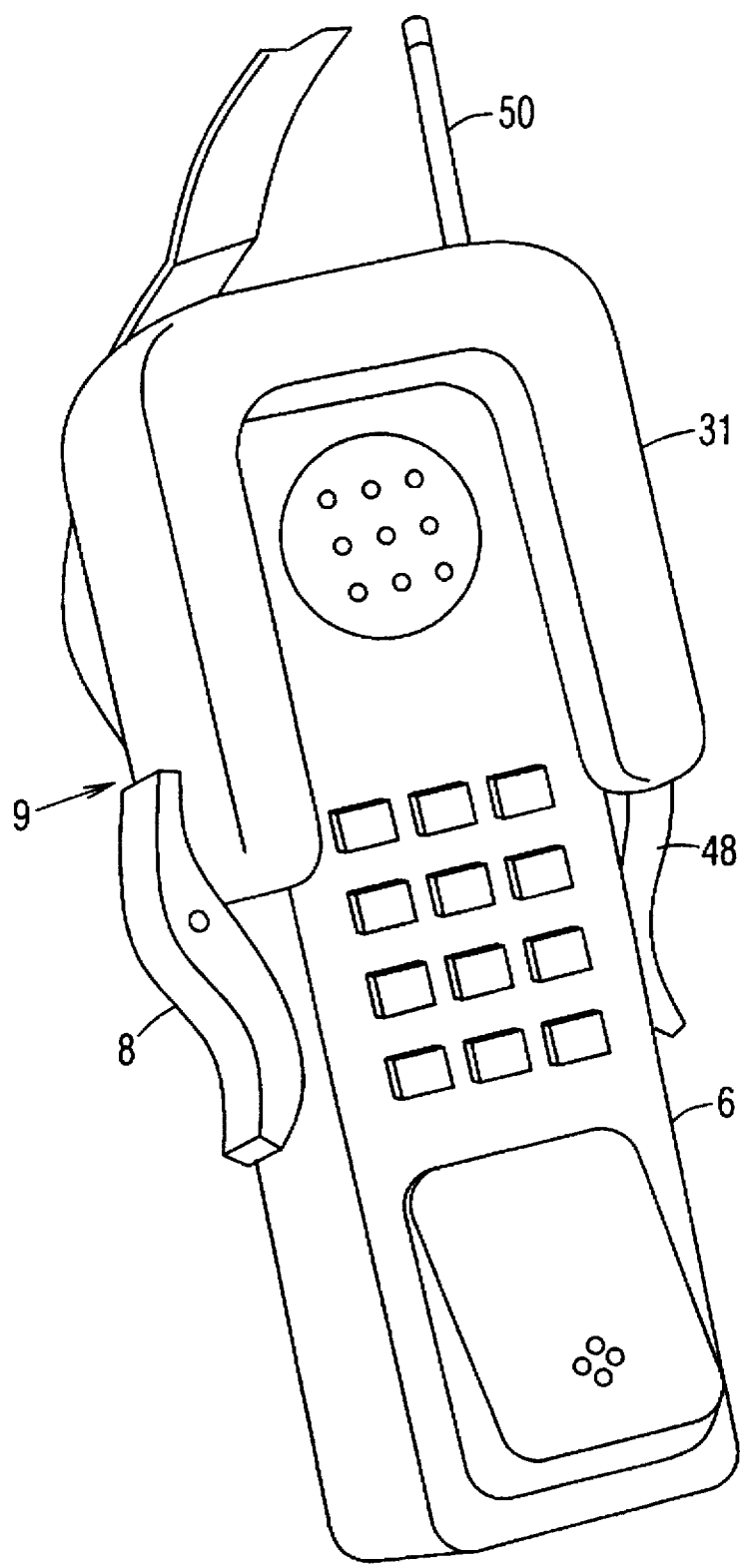
FIG. 9 is a perspective view of the phone holding portion of the present invention with a phone in place.

FIG. 9 shows phone in place in phone holder assembly 9. Gripper fingers 8 & 48 are spread. Antenna 50 passes through open top area. Cushion 31 helps phone 6 stay in place as well as cushioning the user's ear.

What is claimed is:

1. An over the head hands free phone holder for positioning a phone against a head of a person, comprising:

a curved headband having opposite ends;

an elongated hollow phone holding housing attached to one of said ends of said headband, said phone holding housing having a back wall, longitudinal opposite side walls connected orthogonally to opposite side edges of said back wall, and a transverse lower end wall extending between lower ends of said side walls, said side walls being substantially longer than said lower end wall, so that said phone holding housing is defined with a completely open inner side for receiving the phone but completely exposing an inner side of the phone for enabling access to a keypad on the phone, said phone holding housing having a top opening between top ends of said side walls for passing an antenna of the phone; and an inverted U-shaped cushion attached to a top end of said phone holding housing, said inverted U-shaped cushion having a transverse portion extending between said top ends of said side walls, and longitudinal side portions extending downwardly along said side walls, said inverted U-shaped cushion for enabling the phone to be inserted into said phone holding housing;

a pair of gripping fingers attached to said side walls of said phone holding housing for gripping the phone, each of said gripping fingers being hinged about an axis normal to said back wall, said gripping fingers being elongated in a direction parallel to said back wall for compactness.

2. The over the head hands free phone holder of claim 1, further including a non-phone holding housing attached to another one of said ends of said headband, said non-phone holding housing including a sliding wall mounted against a fixed wall, a plurality of holes on said sliding wall being in registration with corresponding holes on said fixed wall for passing sound, said sliding wall being movable to move said plurality of holes thereon out of registration with said corresponding holes on said fixed wall for blocking unwanted sound.

3. The over the head hands free phone holder of claim 1, further including a counterweight arranged in said non-phone holding housing, said counterweight for being generally equal to a weight of the phone so as to balance said phone holder on said person.

* * * * *